Patented May 22, 1928.

UNITED STATES PATENT OFFICE.

REGINALD WILLIAM EVERATT AND ERNEST HARRY RODD, OF BLACKLEY, MANCHESTER, ENGLAND, ASSIGNORS TO BRITISH DYESTUFFS CORPORATION LIMITED, OF MANCHESTER, ENGLAND.

PROCESS OF SEPARATION OF MONO- AND DI- ALKYL-ARYLAMINES.

No Drawing. Application filed May 9, 1927, Serial No. 190,133, and in Great Britain August 25, 1926.

It has been proposed to separate mixtures of secondary and tertiary aromatic amines by the action of phosgene on the mixed bases, whereby the secondary amine is converted into a disubstituted carbamyl chloride ("urea chloride") whilst the tertiary amine combines with the hydrochloric acid liberated to form a hydrochloride (British Patent No. 128,372). It has also been proposed, working at a higher temperature, to treat a mixture of the secondary and tertiary amine with phosgene in an organic solvent, to convert the whole of the secondary amine into a tetrasubstituted urea, sufficient tertiary amine being present to combine with all the hydrochloric acid liberated (British Patent No. 211,245); this requires at least 55 per cent of diethylaniline in the mixture. The invention now to be described relates to improvements in the process of treating mixtures of secondary and tertiary aromatic amines with phosgene to effect their separation. The process of Letters Patent No. 128,372 has the drawback that it can only be applied successfully when the proportion of secondary base to tertiary base is low. When this proportion exceeds about 20–25 per cent, mechanical difficulties arise owing to the separation of solid which prevents stirring before all the necessary phosgene has been introduced. Moreover, using higher proportions of secondary base, some of this appears to be converted into hydrochloride, which is not acted upon by phosgene, in spite of the presence of excess of tertiary base. The use of a solvent does not overcome this difficulty, and, moreover, involves an expensive recovery. In Letters Patent No. 128,372, it is stated that, when there is excess of secondary base present, it can be removed in stages; this is obviously a troublesome and expensive process.

We have discovered that the reaction between phosgene and the secondary amine proceeds as readily in presence of water as in its absence, and that a considerable technical improvement in the process results from the use of water. When water is present it becomes possible to work with mixtures of secondary and tertiary amines richer in secondary amine. The water dissolves the hydrochlorides of the amines as they are formed, whether of the secondary or tertiary base, and these bases can be again set free during the treatment with phosgene by gradual addition of alkali, this addition being only necessary when the proportion of secondary base is above 25–30 per cent. In this way we are able in a single treatment to separate substantially pure diethylaniline and phenylethylcarbamyl chloride, starting with a mixture containing 66 per cent of mono- and 34 per cent of diethylaniline. In such a mixture, which is readily obtained commercially, the proportion of tertiary base is insufficient to combine with the hydrochloric acid liberated in the formation of the urea chloride, and such a mixture could not therefore be separated by the process of British Patent No. 211,245. The urea chloride may either be hydrolyzed to monoethylaniline, or may be condensed with a primary of secondary amine or with ammonia to form a substituted urea.

Our invention, therefore, consists in treating a mixture of monoalkyl- and dialkyl-arylamines of any composition with phosgene in presence of water, with gradual addition of alkali to neutralize part or all of the amine hydrochlorides formed, until all the secondary amine present has been acted upon by the phosgene. The tertiary amine is then removed by extraction with acid and filtration from the urea chloride. The gradual addition of alkali may be realized technically in a convenient manner by using a sparingly soluble alkali such as slaked lime. The amount of lime necessary for reaction may be put into the reaction mixture in its entirety before treating with phosgene.

*Example I.*—302.5 parts of a mixture containing 40 per cent of mono- and 60 per cent of di-ethylaniline is stirred with 300 parts of water and phosgene is passed in at a temperature not exceeding 15° C. During the addition of the phosgene, caustic soda solution (or sodium carbonate) is added slowly, keeping the solution always acid to litmus. About 125 parts of phosgene are needed to react with all the monethylaniline. Hydrochloric acid is now added, keeping the temperature below 20° C. to dissolve all the diethylaniline, and the phenylethycarbamyl chloride is filtered off and washed with dilute hydrochloric acid. From the acid filtrate, diethylaniline is recovered containing less than 1 per cent of monoethylaniline, in almost theoretical yield, and the weight of phenylethylcarbamyl chloride is about 160 parts.

The phenylethylcarbamyl chloride may then be hydrolyzed to produce pure monoethylaniline, or it may be condensed with a further molecule of monoethylaniline to form the urea.

*Example II.*—273 parts of a mixture containing 66 per cent of monoethylaniline and 34 per cent of diethylaniline is added to 700 parts of water containing 85 parts of slaked lime. The mixture is vigorously stirred, cooled to a temperature below 15° C., and phosgene is passed in until the gas it no longer freely absorbed. Slow addition of phosgene is then continued for a short time to complete the reaction, and the product is worked up as described in Example I.

What we claim and desire to secure by Letters Patent is:—

1. The separation of mono- and di-alkyl-arylamines by treating a mixture thereof with phosgene in the presence of water, and adding gradually an alkali to neutralize the amine hydrochlorides formed, until all the secondary amine present has been acted upon by the phosgene.

2. The separation of mono- and di-alkyl-arylamines by treating a mixture thereof with phosgene in the presence of water, adding gradually an alkali to neutralize the amine hydrochlorides formed, until all the secondary amine present has been acted upon by the phosgene, then extracting the tertiary amine with acid, filtering from the urea chloride and hydrolyzing the urea chloride to mono-alkyl-arylamine.

3. The separation of mono- and di-ethylaniline by treating a mixture thereof with phosgene in the presence of water and adding gradually an alkali to neutralize the amine hydrochlorides formed, until all the mono-ethylaniline present has been acted upon by the phosgene.

4. The separation of mono- and di-ethylaniline by treating the mixture thereof with phosgene in the presence of water, adding gradually an alkali to neutralize the amine hydrochlorides formed, until all the secondary amine present has been acted upon by the phosgene, then extracting the tertiary amine with acid, filtering from the urea chloride and hydrolyzing the urea chloride to mono-ethylaniline.

In testimony whereof we have signed our names to this specification.

REGINALD WILLIAM EVERATT.
ERNEST HARRY RODD.